Patented Mar. 9, 1937

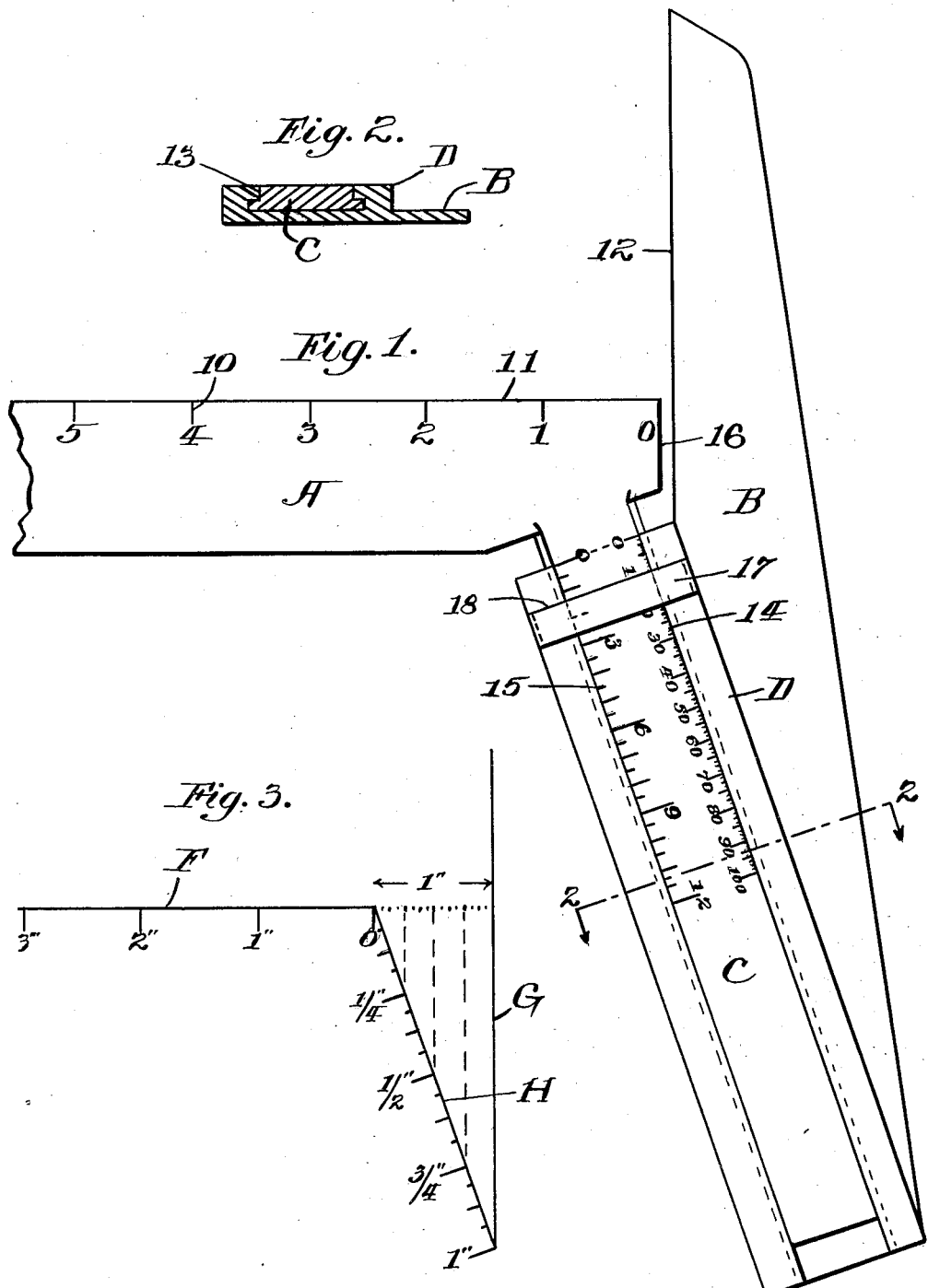

2,073,281

UNITED STATES PATENT OFFICE 2,073,281

DRAFTSMAN'S PLOTTER

Carl Maier, Los Angeles, Calif., assignor of one-half to Jesse C. Jessen, Los Angeles, Calif.

Application April 10, 1935, Serial No. 15,615

6 Claims. (Cl. 33—103)

My invention relates to an improved draftsman's plotter, the primary object being to provide a device of the type stated by the use of which, greater accuracy and speed can be attained by draftsmen. Among further objects is to provide a draftsman's plotter which has the advantage stated and which is simple and inexpensive in construction and which can be used by a draftsman for plotting measurements and for drafting.

In the accompanying drawing forming part of this specification, Fig. 1 is a plan or my improved draftsman's plotter showing the gauge set to measure fractional units of measurement; Fig. 2 is a section taken on the line 2—2 of Fig. 1, and Fig. 3 is a diagram illustrating my invention in skeleton outline.

In the drawing, A is a scale of any suitable type or design desired, that shown being flat and provided with any suitable English metric or other major scale graduations 10, along its working line or edge 11. As shown, the major scale, starting at zero at its right hand end is graduated towards the left to represent feet or inches or divisions thereof. Adjoining the zero end 16 of the major scale is a gauge B, resembling a thin plate lying and movable in substantially the same plane as scale A. This gauge has a straight edge 12 at substantially right angles and perpendicular to the major scale line 11 and coincident with said zero marking when the gauge is adjusted at closed position. Extending at an oblique angle to the horizontal line of the major scale is a guide C, resembling a straight stationary arm on which the gauge B is movably gibbed at 13 (see Fig. 2), by the slide or projector D. The gauge is integral with the slide and as the slide is slid longitudinally along the guide and gauge travels in the plane and away from or towards the zero end 16 of the major scale while its straight edge remains perpendicular to the working line 11 of the major scale.

As slide D moves outwardly along the stationary guide arm C, the gauge which is rigid with the slide moves to the right, therefore any division of either of the fractional scales 14 or 15 indicated by member 17 will be that exact proportion between the zero end of the major scale and the working edge 12 of gauge B. A sight piece resembling a narrow band 17 spans the guide and is secured to the slide. This sight piece has an indicating edge 18 which registers with the indicating marks on scales 14 and 15 and enables the user to determine measurements more easily and accurately. Therefore my invention employs a stationary major scale and a gauge having an adjustable vernier or fractional scale or scales, the travel of the adjustable scale or scales being at an angle to the major scale, whereby the movement of the gauge is controlled by a greater movement of the fractional scale or scales to facilitate more accurate adjustment.

The angle at which the vernier scales are disposed to the stationary scale determines the length of travel of the slide on the guide to adjust the gauge for any fractional measurement desired. Hence a fine adjustment of the gauge is accomplished in an extremely simple and effective manner.

The vernier scales 14 and 15 can be of any suitable number and type desired. As shown scale 14 is divided into one hundredths and scale 15 into twelfths and fractional parts thereof. These scales may however be of any other denomination desired. The straight edge 12 of the gauge can be used as a working edge for drafting lines perpendicular to the line or edge of the major scale. The device and parts thereof can be made out of metal or any other suitable material or materials desired.

In Fig. 3, a diagrammatic view of my invention for illustrative purposes is shown, in which F is the longitudinal major scale line shown for example divided into inches. G is the gauge line perpendicular to the major scale line and movable outwardly away from and towards the zero end of the major line. H is the extensible guide line of the gauge, bearing a fractional inch scale and disposed at an oblique angle to the major scale line. This view emphasizes the fine adjustment produced by my invention through the use of a vernier scale, interposed at an oblique angle between a major scale and gauge.

In use, assuming that it is desired to plot five hundred and ten units along a horizontal line or at a point in a line perpendicular thereto, the major scale is adjusted with digit five coincident with and so marked as the left hand end of the measurement desired. The gauge is then extended by moving the slide outwardly from zero along the guide until the edge 18 of the sight piece 17 registers with the tenth digit of scale 14. A point can then be marked at the other termination of the measurement at any position desired along the straight edge 12 of the gauge. The straight edge 12 also serves as a working edge for drafting lines at the desired distance from and perpendicular to the working line of the major scale. In Fig. 1, I have shown the plotter adjusted to measure at any major unit of length along the major scale desired and the gauge set to measure plus one tenth of a unit in accordance with the fractional scale 14.

It is within the spirit of my invention to employ the elements described without using any scales, in which event the major scale is used as a stationary straight edge, supplemented by the gauge which is used as a transverse straight edge movable longitudinally of said stationary straight edge for drafting parallel lines, or merely a scale or scales can be employed between the guide and slide for determining the movement of the gauge or movable straight edge, when desired.

In accordance with the patent statutes, I have described the principles of operation of my invention, together with the construction thereof which I now consider to represent the best embodiment thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. A device of the class set forth, comprising, a longitudinal straight edge, a guide extending downwardly and obliquely from near one end of said straight edge, and a slide movable obliquely to said longitudinal straight edge and longitudinally on said guide having a straight edge extending above said longitudinal straight edge, said slide being adapted to be adjusted longitudinally of said longitudinal straight edge by the oblique movement of said slide along said guide.

2. A draftsman's plotter, comprising, a longitudinal straight edge, a guide extending downwardly and obliquely from said straight edge, and a slide movable obliquely to said longitudinal straight edge and longitudinally on said guide having a straight edge extending substantially vertically above the line of said longitudinal straight edge, said slide and guide being graduated to indicate the intersecting position of the vertical straight edge across the line of said longitudinal straight edge.

3. A draftsman's plotter, comprising, a body saving a scale extending along a longitudinal line, a guide arm extending obliquely from one end of said scale, and a slide movable longitudinally on said guide having a gauge extending across the line of said scale in conjunction with and beyond said end, said gauge being adjusted in relation to the end of said scale by the movement of said slide, and said slide and guide being graduated to indicate the adjustment of said gauge.

4. A draftsman's plotter, comprising, two straight edges, one being arranged transverse and extending above the other, an oblique arm on one of said straight edges and a companion slide on the other straight edge and movable longitudinally along said oblique arm to adjust said straight edges apart, and a scale associated with said slide and arm adapted to indicate movement therebetween and the adjustment between said straight edges.

5. A draftsman's plotter, comprising, a body having a scale extending along a longitudinal line, a guide extending downwardly along an oblique guide line from said scale, a slide movable on said guide along said oblique line and having a straight edge extending upwardly above the longitudinal scale and adjustable by the oblique movement of said slide to intersect the longitudinal line of said body scale, and a vernier scale associated with said guide and slide indicating the precise adjustment of said straight edge as related to said longitudinal scale.

6. A draftsman's plotter, comprising, a longitudinal straight edge having an oblique guide arm near one end thereof and extending therefrom and a companion transverse straight edge intersecting the line of said longitudinal straight edge and having a guide movable longitudinally along said guide arm, whereby a series of parallel lines intersecting said longitudinal line can be drawn by the use of one straight edge while the other is held stationary.

CARL MAIER.